United States Patent
Leizerovich et al.

(10) Patent No.: US 12,493,085 B2
(45) Date of Patent: Dec. 9, 2025

(54) APPARATUS, SYSTEM, AND METHOD FOR DETECTING OPTICAL EVENTS ASSOCIATED WITH DISTRIBUTION TRANSFORMERS

(71) Applicant: UBICQUIA, INC., Fort Lauderdale, FL (US)

(72) Inventors: Gustavo Dario Leizerovich, Aventura, FL (US); Steven G. Hemmer, Lake Worth, FL (US)

(*) Notice: Subject to any disclaimer, the term of this patent is extended or adjusted under 35 U.S.C. 154(b) by 154 days.

(21) Appl. No.: 18/240,311

(22) Filed: Aug. 30, 2023

(65) Prior Publication Data

US 2024/0069120 A1 Feb. 29, 2024

Related U.S. Application Data

(60) Provisional application No. 63/402,549, filed on Aug. 31, 2022.

(51) Int. Cl.
*G01R 31/62* (2020.01)

(52) U.S. Cl.
CPC .................... *G01R 31/62* (2020.01)

(58) Field of Classification Search
CPC .................................. G01R 31/62
USPC ......................................... 324/547
See application file for complete search history.

(56) References Cited

U.S. PATENT DOCUMENTS

| 10,895,566 | B1 * | 1/2021 | Teepe | G01N 17/04 |
| 11,163,017 | B2 * | 11/2021 | Mostafavi | G01J 3/1895 |
| 11,467,043 | B2 * | 10/2022 | Valentin | G01K 11/32 |
| 11,719,559 | B2 * | 8/2023 | Kiesel | G01D 5/35312 |
| | | | | 324/547 |
| 2014/0334073 | A1 | 11/2014 | Thompson et al. | |

(Continued)

OTHER PUBLICATIONS

U.S. Patent & Trademark Office as International Searching Authority, International Search Report in connection with counterpart International Application No. PCT/US2023/031761, Jan. 26, 2024, 2 pages.

(Continued)

*Primary Examiner* — Christopher P Mcandrew
(74) *Attorney, Agent, or Firm* — Daniel C. Crilly; Pablo Meles (57) ABSTRACT

A distribution transformer system includes a distribution transformer and a distribution transformer monitoring device (DTM). The DTM includes an optical sensor operable to generate an output signal (e.g., an output voltage) in response to incident light, a communication interface, non-transitory memory storing processor-executable instructions, and a processor operably coupled to the optical sensor, the communication interface, and the memory. The processor is operable in accordance with the processor-executable instructions to, among other things, determine whether the output signal generated by the optical sensor substantially corresponds to one of multiple stored data signatures representing light producing events (such as arcing, fire, or the presence of unexpected ambient light) and, when such criterion is met, communicate an alert to a remote computing device via the communication interface. The distribution transformer may be pad-mountable, aerially mountable (e.g., mountable to a utility pole), or cabinet mountable, as applicable.

17 Claims, 6 Drawing Sheets

(56) References Cited

U.S. PATENT DOCUMENTS

| | | |
|---|---|---|
| 2017/0045571 A1 | 2/2017 | Joseph et al. |
| 2018/0301279 A1* | 10/2018 | Klaponski ............... H01F 27/20 |
| 2019/0011491 A1* | 1/2019 | Raghavan ............. G01J 3/1895 |
| 2020/0098513 A1* | 3/2020 | Zhang ................... H01F 27/402 |
| 2020/0191763 A1* | 6/2020 | Berler ................... H01F 27/402 |
| 2021/0116517 A1 | 4/2021 | Snook, II et al. |
| 2021/0123775 A1* | 4/2021 | Kiesel .................... G01R 31/62 |
| 2021/0123964 A1* | 4/2021 | Mostafavi ............. G01J 3/1895 |
| 2022/0148800 A1 | 5/2022 | Hutson et al. |
| 2023/0034254 A1* | 2/2023 | Pedrosa Santos ..... G08B 21/20 |

OTHER PUBLICATIONS

U.S. Patent & Trademark Office as International Searching Authority, Written Opinion of the International Searching Authority in connection with counterpart International Application No. PCT/US2023/031761, Jan. 26, 2024, 9 pages.

\* cited by examiner

APPARATUS, SYSTEM, AND METHOD FOR DETECTING OPTICAL EVENTS ASSOCIATED WITH DISTRIBUTION TRANSFORMERS

CROSS-REFERENCE TO RELATED APPLICATIONS

The present application claims the benefit of and priority upon U.S. Provisional Patent Application No. 63/402,549, which was filed on Aug. 31, 2022, and is incorporated herein by this reference as if fully set forth herein.

TECHNICAL FIELD

The present disclosure relates generally to fault monitoring and detection methods and systems for distribution transformers. More particularly, but not exclusively, the present disclosure relates to monitoring and detecting optical events relating to distribution transformers.

BACKGROUND

Power system infrastructure includes power lines, transformers, and other devices for power generation, power transmission, and power delivery. A power source generates power, which is transmitted along high voltage (HV) power lines for long distances. Typical voltages found on HV transmission lines range from 66 kilovolts (kV) to more than 800 kV. Within the power system and prior to delivery of power to a customer, the HV power is typically stepped down to medium voltage (MV) power in the 6-40 kV range, and then stepped down further to low voltage (LV) levels in the 100 volts (V) to 600V range by distribution transformers. LV power lines typically carry power to residential and business customer premises.

A power distribution system for a given area may include many distribution transformers. In the United States, local distribution transformers typically feed anywhere from one to ten homes, depending upon the concentration of the customer premises in a particular area. Thus, the monitoring costs, replacement costs, and maintenance costs for distribution transformers can be a significant factor in the cost of power distribution.

Distribution transformers can fail for a variety of reasons. Some failure modes may begin with arcing between a primary bushing or terminal and ground and others begin with arcing between a secondary bushing/terminal and ground. Additionally, curious individuals and power thieves may attempt to gain access inside the hatch of a pad-mounted distribution transformer (i.e., one located on a concrete or dirt pad at ground level in areas with underground utilities). For the curious, such access can prove very dangerous and even deadly, while for the thieves, such access facilitates their thievery.

SUMMARY

In some embodiments, a method for detecting an optical event associated with (e.g., within or proximate to) a pad-mounted (padmount) or aerial distribution transformer may include generating, by an optical sensor positioned on, within, or otherwise proximate to a housing of the distribution transformer, output data or one or more output signals (such as one or more voltage or current signals) and determining, by a processor operably coupled to the optical sensor, whether the output data or output signal(s) substantially corresponds to one of two or more data signatures representing optically detectable or other events. The method may further include communicating, by the processor via a communication interface, an alert to a remote computing device when the output data or output signal(s) substantially corresponds to one of the data signatures.

In some embodiments, determination of whether the optical sensor output data substantially corresponds to one of the data signatures may include determining whether an output voltage from the optical sensor is greater than or equal to a voltage threshold and, when such criterion is met, determining whether the output voltage remained greater than or equal to the voltage threshold for at least a threshold time period as required by one of the data signatures. In such embodiments, the processor may communicate an alert via the communication interface upon determining that the voltage and time thresholds for a particular data signature have been met.

In some embodiments, the voltage threshold is a voltage that corresponds to 50 lumens of incident light and the threshold time period is five milliseconds. In such embodiments, the alert may inform the remote computing device that arcing is occurring or has occurred between at least one of secondary terminals or bushings and ground. The terms "terminals" and "bushings" are used interchangeably throughout the description and appended claims.

In some embodiments, the voltage threshold is a voltage that corresponds to 100 lux of incident light and the threshold time period is ten seconds. In such embodiments, the alert may inform the remote computing device that a fire is occurring or has occurred at or proximate to the distribution transformer.

In some embodiments, the distribution transformer is a pad-mounted distribution transformer, and at least the optical sensor and one or more secondary terminals of the distribution transformer's power transformer are positioned within a hatch defined by a hatch door or hood and at least one wall of the pad-mounted distribution transformer's housing. In one such embodiment, the alert may inform the remote computing device that arcing has occurred between one or more of the secondary terminals and ground. In another such embodiment, the alert may inform the remote computing device that a fire is occurring or has occurred in the hatch. In a further embodiment, the alert may inform the remote computing device that ambient light has entered the hatch, indicating that the hatch door may have been opened or removed (e.g., without authorization from the utility that owns or operates the power transmission system containing the distribution transformer).

In some embodiments, the optical sensor, the processor, and the communication interface form part of a distribution transformer monitoring device or, equivalently, a distribution transformer monitor (DTM). In one such embodiment, the DTM is positioned within the hatch of the pad-mounted distribution transformer. The DTM may be mounted to the hatch door, a wall, or a floor of the distribution transformer housing. In an alternative embodiment in which the DTM is used with an aerial distribution transformer, the DTM may be mounted to a top or cover, a wall, or a floor of the distribution transformer housing.

In some embodiments, a DTM includes an optical sensor operable to generate an optical sensor output signal in response to incident light, a communication interface, a non-transitory memory storing processor-executable instructions, and a processor operably coupled to the optical sensor, the communication interface, and the memory. The processor is operable in accordance with the processor-executable instructions to, among other things, determine whether the output signal from the optical sensor substantially matches or corresponds to a signal signature representing an event, which signal signature may be one of several signal signatures representing respective different events. When the optical sensor output signal substantially corresponds to the signal signature, the processor communicates an alert to a remote computing device via the communication interface.

In some embodiments, the processor determines whether the optical sensor's output signal substantially matches the signal signature by: (a) determining whether the output signal is greater than or equal to a signal threshold, (b) when such criterion is met, determining whether the output signal remained greater than or equal to the signal threshold for at least a threshold time period; and (c) determining that the output signal substantially corresponds to the signal signature when the optical sensor's output signal remained greater than or equal to the signal threshold for at least the threshold time period.

For example, where the optical sensor's output signal is a voltage, the processor may determine whether the optical sensor's output signal substantially matches the signal signature by: (a) determining whether the output voltage is greater than or equal to a voltage threshold, (b) when such criterion is met, determining whether the output voltage remained greater than or equal to the voltage threshold for at least a threshold time period; and (c) determining that the output voltage substantially corresponds to the signal signature when the optical sensor's output voltage remained greater than or equal to the voltage threshold for at least the threshold time period.

In some embodiments in which the optical sensor generates or produces an output voltage responsive to incident light, the voltage and time thresholds for an arcing event signature may be a voltage that corresponds to 50 lumens of incident light (e.g., 200 mV depending on the selected optical sensor) and a time period of one second or less (e.g., a time period in the range of 3 ms to 1000 ms). Such arcing would typically be between a secondary terminal of the distribution transformer and ground but may alternatively or additionally be between a primary terminal of the distribution transformer and ground.

In other embodiments in which the optical sensor generates or produces an output voltage responsive to incident light, the voltage and time thresholds for a fire event signature may be a voltage that corresponds to 100 lux of incident light (e.g., voltage in the range of 200 mV to 2500 mV depending on the selected optical sensor) and a time period of at least ten seconds. In further embodiments in which the optical sensor generates or produces an output voltage responsive to incident light, the voltage and time thresholds for an open hatch door event signature for a pad-mounted distribution transformer may be a voltage that corresponds to 100 lux of incident light and a time period of at least ten seconds (ten to thirty seconds). Other signal and time thresholds may be chosen for arcing, fire, open hatch door, and other events based on the selected optical sensor and particular use case.

In some embodiments, the distribution transformer is a pad-mounted distribution transformer, where at least the optical sensor and the secondary terminal or terminals of the distribution transformer are positioned within a hatch of the distribution transformer. In such a case, the processor communicates an alert (e.g., data message) to appropriately inform the remote computing device of an event that is occurring or has occurred, such as arcing in the hatch, a fire in the hatch, or unauthorized opening of the hatch door, based on comparing the optical sensor output signal to event data signatures to detect a substantial match.

In some embodiments, the hatch door or a wall of the distribution transformer may include a translucent window aligned with the optical sensor when the optical sensor is positioned within the hatch, such as part of a DTM. Such window may allow ambient light external to the hatch to be incident upon the optical sensor even when the hatch door is closed. Such an embodiment may be desirable where the optical sensor is used to also report environmental conditions in which the distribution transformer is currently operating or had been operating.

In other embodiments of the present disclosure, a distribution transformer system may include a distribution transformer and a DTM. In these embodiments, the distribution transformer includes a sealed tank containing a power transformer and insulative coolant, and one or more secondary terminals of the power transformer. The DTM may include an optical sensor operable to generate an output signal in response to incident light, a communication interface, non-transitory memory storing processor-executable instructions, and a processor, operably coupled to the optical sensor, the communication interface, and the memory. The processor may be operable in accordance with the processor-executable instructions to determine whether the optical sensor's output signal substantially corresponds to a signal signature representing an event and, when such criterion is met, communicate an alert to a remote computing device via the communication interface. In such distribution transformer systems, the DTM may be positioned within two meters of the one or more secondary terminals of the distribution transformer. In other embodiments, the DTM may additionally include a plurality of parameter sensors operably coupled to the processor to enable the processor to monitor a plurality of parameters of the distribution transformer.

In further embodiments, the DTM processor may determine whether the optical sensor's output signal substantially corresponds to a signal signature representing an event by determining whether the output signal (e.g., a voltage) is greater than or equal to a signal threshold associated with the event and, when such criterion is met, determining whether the output signal remained greater than or equal to the signal threshold for at least a threshold time period. When the latter criterion is also met, the processor may determine that the output signal substantially corresponds to the signal signature.

In further embodiments of the present disclosure, a distribution transformer system may include a pad-mounted distribution transformer and a DTM. In these embodiments, the distribution transformer includes a sealed tank containing a power transformer and insulative coolant, an openable and closable hatch door, and one or more secondary terminals of the power transformer positioned within a hatch defined by a wall of the tank and the hatch door when the hatch door is closed. In such a case, the hatch is separated from an internal chamber of the tank by at least the wall of the tank. The DTM may include an optical sensor operable to generate an output signal in response to incident light, a communication interface, non-transitory memory storing processor-executable instructions, and a processor, operably coupled to the optical sensor, the communication interface, and the memory. The processor may be operable in accordance with the processor-executable instructions to determine whether the optical sensor's output signal substantially corresponds to a signal signature representing an event and, when such criterion is met, communicate an alert to a remote computing device via the communication interface.

BRIEF DESCRIPTION OF THE DRAWINGS

Non-limiting and non-exhaustive embodiments are described with reference to the following drawings, wherein like reference numerals refer to like components or elements throughout the various views, unless otherwise specified. The sizes and relative positions of elements in the drawings are not necessarily drawn to scale. For example, the shapes of various elements are selected, enlarged, and positioned to improve drawing legibility. The particular shapes of the elements have been selected for ease of recognition in the drawings.

DETAILED DESCRIPTION

In the following description, certain specific details are set forth to provide a thorough understanding of various disclosed embodiments. However, one skilled in the relevant art will recognize that embodiments may be practiced without one or more of these specific details, or with other methods, components, materials, etc. Also in these instances, well-known structures may be omitted or shown and described in reduced detail to avoid unnecessarily obscuring descriptions of the exemplary embodiments.

In some embodiments, a distribution transformer monitoring device or, equivalently, a distribution transformer monitor (DTM) installed within a padmount transformer hatch, on a housing of an aerial distribution transformer, or otherwise at or proximate to a distribution transformer is used to detect light-generating or optical events associated with the distribution transformer. One embodiment can include programming an onboard processor with one or more photosensor output data signatures corresponding to light emission or other optical events, such as arcing between a primary terminal and ground or between a secondary terminal and ground, fire within the hatch, or an opening of the hatch door, and sending an alarm or other alert (or taking appropriate and available remediation actions) if an event is detected. An alternative embodiment can include programming the server with photosensor output data signatures representing the particular events and sending raw photosensor output data to the server for event analysis and alarm generation. A priority schedule can also be set for various types of alarms (e.g., arcing and fire having higher priorities than hatch door opening). Other embodiments may combine the photosensor output data with other sensor data to make appropriate assessments and communicate alarms accordingly.

FIGS. 1-5 illustrate exemplary distribution transformer systems and their included components, in accordance with embodiments of the present disclosure. Each such system includes, inter alia, a distribution transformer (which may be pad-mounted or aerial) and a DTM. The DTM includes an optical sensor and a processor executing a process for detecting optical events associated with the distribution transformer of the system. The DTM may also include or be coupled to other sensors monitoring various parameters of the distribution transformer. For example, sensors such as one or more Rogowski coils, current transformers, voltage sensors, temperature sensors, pressure sensors, cameras, or other sensors may form part of the DTM or be in communication with the DTM or may be in communication with a remote computer system that also communicates with the DTM and potentially other sensors. Other parameter sensors contemplated within the embodiments of the present disclosure include, but are not limited to, devices that measure current, voltage, impedance, Power Factor, or other parameters useful in detecting potential distribution transformer faults or conditions requiring further review, monitoring, maintenance, repair, replacement or other desirable interventions prolonging the efficient useful life of components and systems being monitored. When such other sensors are included as part of the DTM or are otherwise positioned at the distribution transformer, the distribution transformer system can detect optical events or other anomalies based on signals obtained or derived from the optical sensor and one or more of the other sensors.

Figure 1:
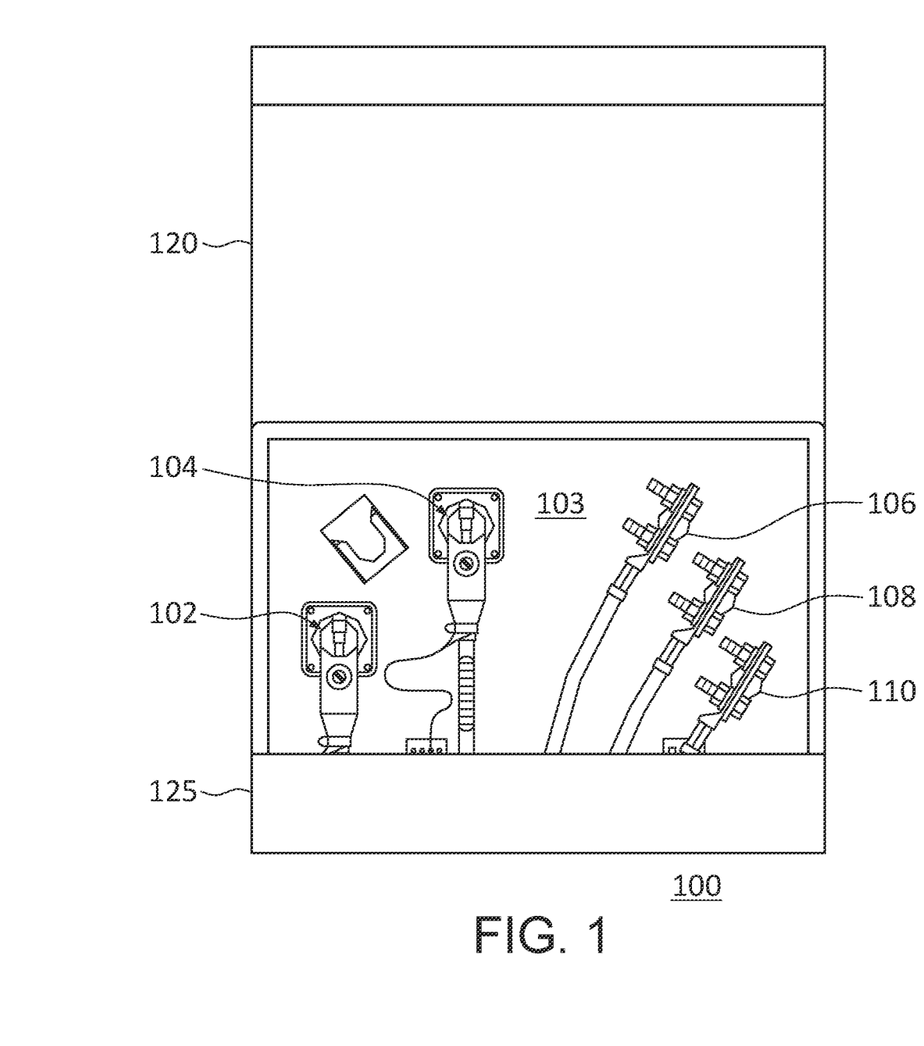
FIG. 1 illustrates a pad-mounted distribution transformer in accordance with exemplary embodiments of the present disclosure.

Referring now to FIG. 1, an exemplary pad-mounted or pad-mountable (i.e., padmount) distribution transformer 100 may include a high voltage primary input terminal 102, a high voltage primary output terminal 104, lower voltage secondary output terminals 106, 108, 110, and a housing 125 having an openable and closeable hood or hatch door 120. The hatch door 120 provides easy access to the primary and secondary terminals 102-110 and other components for installation and maintenance purposes. The hatch door 120 may be hinged or otherwise movably coupled to the main distribution transformer housing 125. As illustrated in FIG. 3B, the transformer housing 125 also includes a sealed tank 126 containing a power transformer (shown in block diagram form as reference numeral 502 in FIG. 5) and a coolant, such as oil (not shown).

Figure 2:
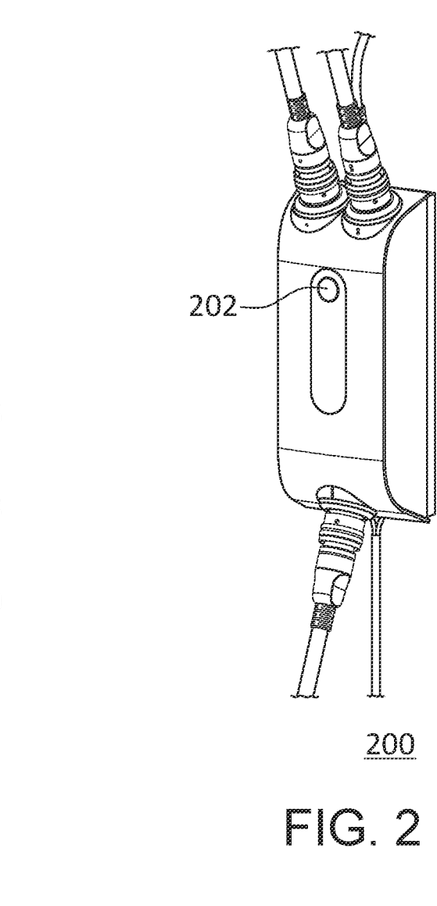
FIG. 2 illustrates distribution transformer monitor (DTM) having an optical sensor in accordance with exemplary embodiments of the present disclosure.

FIG. 2 illustrates DTM 200 having an optical sensor 202 in accordance with exemplary embodiments of the present disclosure. The DTM is a specialized hardware and embedded software device that collects and analyzes various information relating to the operation of a distribution transformer, such as the distribution transformer 100 shown in FIG. 1. The DTM 200 may be installed on a distribution transformer at the time of distribution transformer manufacture or may be a retrofit onto a distribution transformer in the field, whether such distribution transformer is aerial (e.g., pole top mounted), pad-mounted, or cabinet mounted. A residential distribution transformer supplies low voltage power to 5-10 homes and provides the last voltage step-down transition before the power gets to a home or business. The optical sensor 220 may include a transparent window in the DTM housing and an associated photosensor positioned on a circuit board such that the photosensor is optically aligned with the window.

Figure 3A:
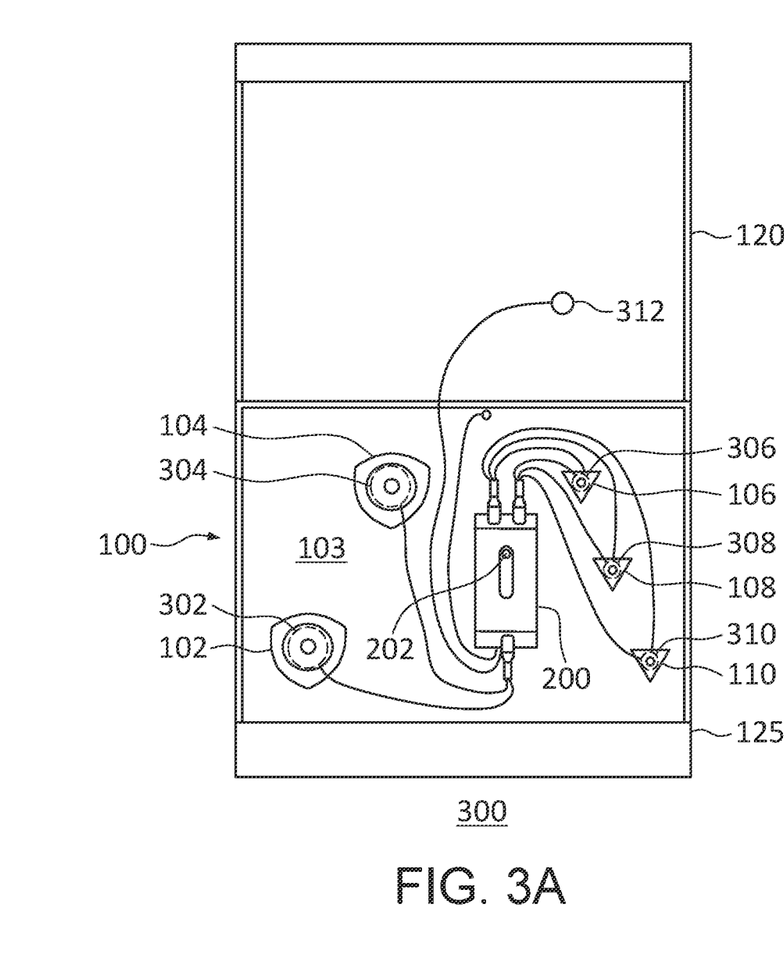
FIG. 3A illustrates a distribution transformer system that includes a pad-mounted distribution transformer and a DTM, in accordance with one exemplary embodiment of the present disclosure.
Figure 3B:
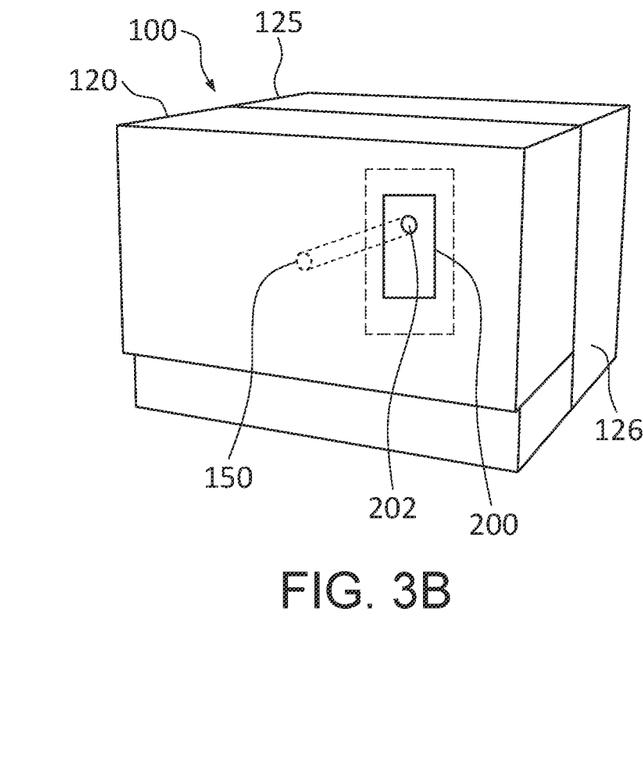
FIG. 3B illustrates a distribution transformer system similar to the system illustrated in FIG. 3A, except that a hatch door of the pad-mounted distribution transformer includes an optional translucent or clear window configured to be substantially optically aligned with an optical sensor of the of the DTM when the hatch door is closed, in accordance with alternative exemplary embodiments of the present disclosure.

Referring to FIG. 3A, an exemplary distribution transformer system 300 includes a distribution transformer, such as the padmount distribution transformer 100 of FIG. 1, and a distribution transformer monitoring device, such as the DTM 200 of FIG. 2. In addition to the optical sensor 202, the system 300 may include other sensors either separately or as part of or coupled to the DTM 200, such as, but not limited to, Rogowski coils 302, 304 secured around or encircling respective primary lines or terminals 102, 104 (high voltage side) of the distribution transformer 100, current transformers (CTs) or Rogowski coils 306, 308, 310 secured around or encircling respective secondary lines or terminals 106, 108, 110 (low voltage side) of the distribution transformer 100, and/or other sensors that can provide additional information for analysis and fault detection by the DTM 200 or a remote computing device.

The primary terminals 102, 104 and the secondary terminals 106, 108, 110 may be secured to and through a wall 103 of the transformer 100 separating the power transformer tank 126 from the hatch. The DTM 200 may also be secured to the wall 103, such as at a location between the primary terminals 102, 104 and the secondary terminals 106, 108, 110. Alternatively, the DTM 200 may be positioned elsewhere within the hatch or within two meters of the primary terminals or the secondary terminals of the distribution transformer, regardless of how and where the distribution transformer is mounted.

The DTM 200 and/or the sensors may communicate measured data or information, computed data or information, or analysis results to a remote computing device, such as a web server, wirelessly via a modem within the DTM 200 or the sensor and an antenna 312, which may be secured through a top or sidewall of the hatch door 120 or through a top or sidewall of the housing 125. The distribution transformer 100 may optionally include a window 150 or lens in the hatch door 120 of the housing 125 to enable the DTM 200 to monitor ambient light outside the closed hatch door 120, as described in more detail with respect to FIG. 3B.

FIG. 3B illustrates the distribution transformer 100 with its hatch door 120 in a closed position and shows an optional clear, transparent, or translucent window 150 in the front wall of the hatch door 120. The window 150 substantially aligns with the optical sensor 202 of the DTM 200 when the hatch door 120 is closed so that external light incident on the window 150 will more likely reach the optical sensor 202. The DTM 200 may be positioned on the center wall 103 of the distribution transformer 100 so as to align the hatch door window 150, when included, with the DTM's optical sensor 202. The optional window 150 may permit the DTM 200 to acquire additional information to assist in detecting anomalies in distribution transformer performance in certain instances (such as detecting an external fire nearby during a nighttime period or detecting lighting strikes nearby that would not otherwise be detected without the window 150 when the hatch door 120 is closed).

Figure 4:
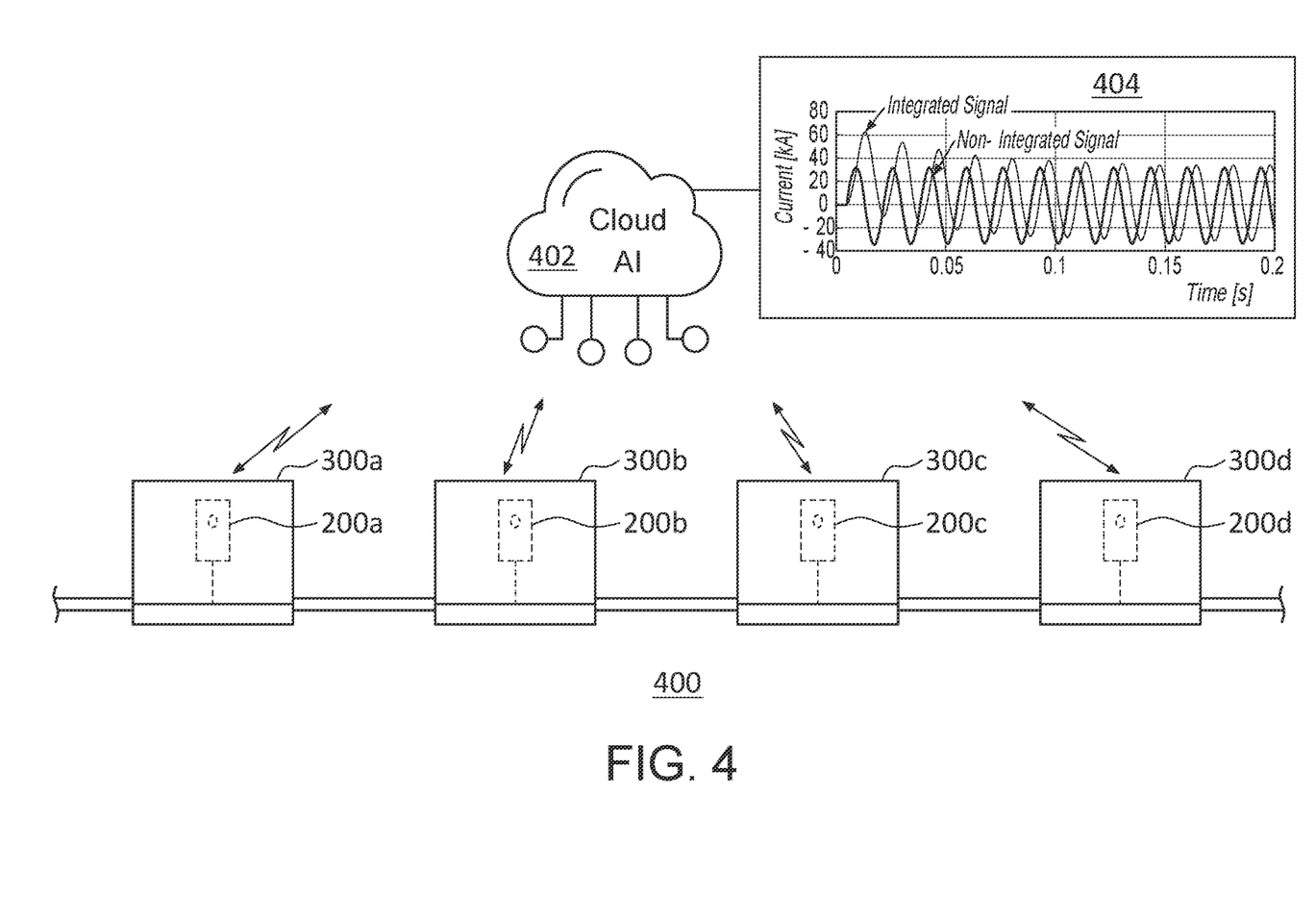
FIG. 4 illustrates a block diagram of an exemplary transmission system having multiple distribution transformer systems, at least some of which are configured similar to the distribution transformer system of FIG. 3A, in accordance with further alternative embodiments of the present disclosure.

FIG. 4 illustrates a block diagram of an exemplary transmission system 400 having multiple distribution transformer systems 300a-300d (four shown for illustration purposes), at least some of which are similar to the distribution transformer system 300 of FIG. 3A, in accordance with further alternative embodiments of the present disclosure. Each DTM 200a-200d may present real-time, near real-time, and/or historical information about the associated distribution transformer at which the DTM 200a-200d is located, in addition to creating an ongoing information access point within a grid architecture. The DTMs 200a-200d may use respective antennas 312 (as shown in FIG. 3A) to transmit such information to a remote computing device 404 via a cloud 402 network, which may use machine learning or other artificial intelligence (AI) to analyze the data and other information received from the DTMs 200a-200d and/or sensors positioned at the distribution transformers.

Distribution transformer systems 300a-300d as contemplated by the present disclosure may be strategically or comprehensively positioned within a transmission system 400 depending on the needs of the transmission system operator. Each of the distribution transformer systems 300a-300d may have its own communication links but could also leverage the remote over-the-air (OTA) capabilities supported by the DTMs 200a-200d. Use of the DTMs' OTA capabilities, when supported, may allow the transmission system operator to perform remote analysis of each distribution transformer system 300a-300d in the transmission system 400, as well as communicate configuration updates to the DTMs 200a-200d without the need for costly truck rolls or unit replacement. Through use of distribution transformer systems 300a-300d that support OTA firmware updates and upgrades, transmission system operators can progressively broaden and deepen the suite of data points captured by DTMs 200a-200d and or other devices operating independent of the DTMs 200a-200d.

Referring again to the power transmission system 400 of FIG. 4, use of the DTMs 200a-200d and optionally other distribution transformer parameter sensor(s) (e.g., such as Rogowski coils on the primary conductors or terminals 102, 104, Rogowski coils or CTs on the secondary conductors or terminals 106, 108, 110, temperature sensors, cameras, microphones, pressure sensors, and so forth) enable the DTMs 200a-200d or a remote computing device 402 to use AI techniques to determine distribution transformer faults or locations of other gird faults.

In some embodiments, the remote computing device 402, such as a cloud server, may use an AI fault detection analysis engine to perform such analysis either using event triggers or polling techniques, which can monitor primary and secondary voltage and current waveforms, as well as other waveforms which can be viewed on a client device display or an oscilloscope. The additional data provided by the optical sensor 202 may further help classify or categorize the types of distribution transformer faults that are detected and provide a better fault location vector in order to pinpoint the locations of such faults on a more granular level. Calculations and/or measurements can be done for some or each distribution transformer in the transmission system 400. All the data collected may be communicated either through a wired connection path or at least partially through a wireless connection path.

Figure 5:
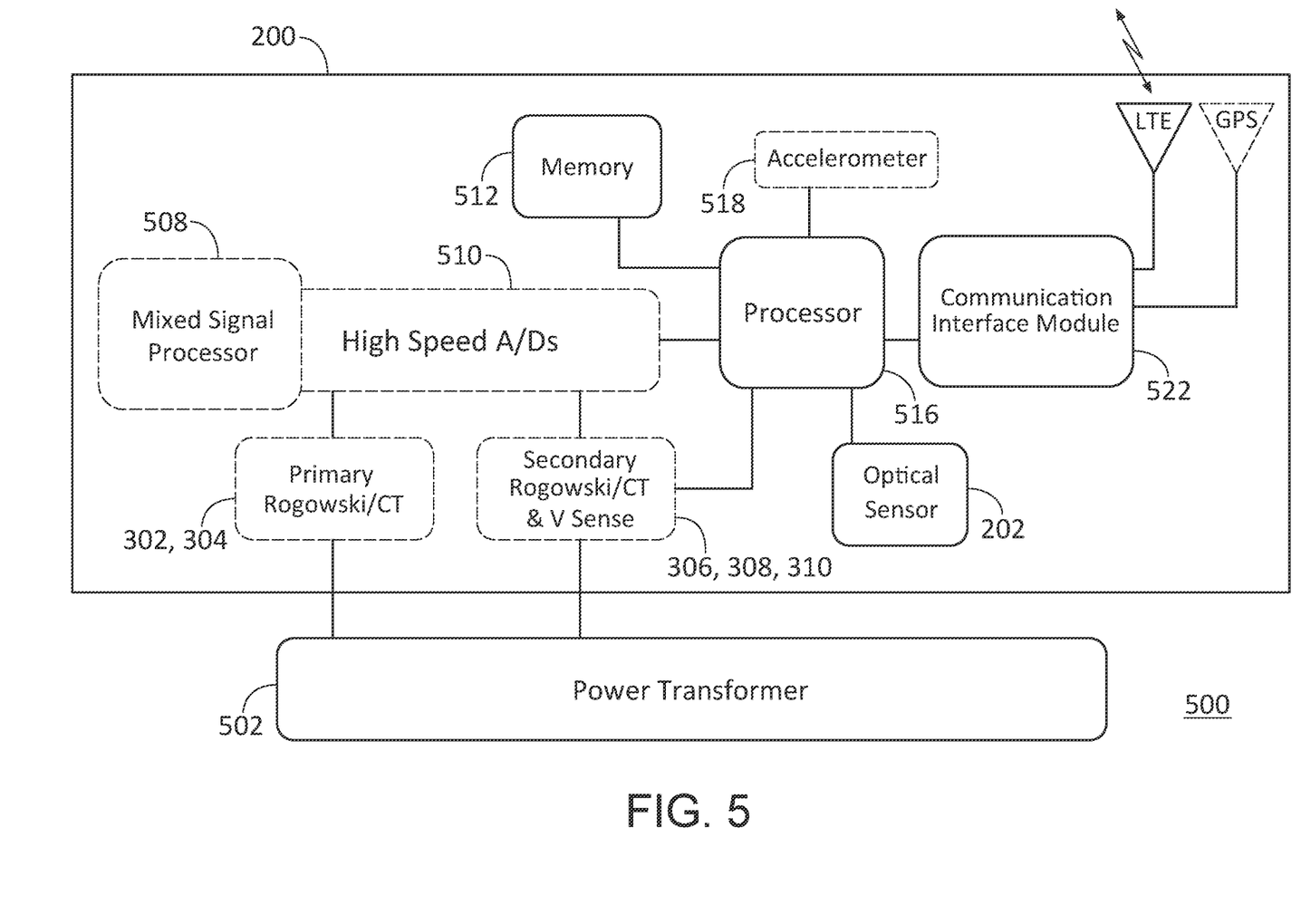
FIG. 5 is a block diagram of a distribution transformer system, which may include a pad-mounted or an aerially mounted distribution transformer, in accordance with exemplary embodiments of the present disclosure.

FIG. 5 is a block diagram of a distribution transformer system 500, which may include a pad-mounted distribution transformer 100, an aerially mounted distribution transformer, or a cabinet mounted distribution transformer, in accordance with other exemplary embodiments of the present disclosure. The distribution transformer system 500 illustrated in FIG. 5 may be the distribution transformer system 300 illustrated in FIG. 3A when such distribution transformer system 500 includes a pad-mounted distribution transformer, such as the pad-mounted distribution transformer 100 of FIG. 1. The distribution transformer system 500 may include multiple separate components or components that form parts of integrated devices that include all or some of the functionality of the separate individual components. For example, the exemplary distribution transmission system 500 may include a power transformer 502 and a DTM 200. The DTM 200 may include, inter alia, an optical sensor 202, a processor 516, a communication interface module 522, non-transitory memory 512, and a wireless communication antenna (e.g., an LTE or 5G antenna). The DTM 200 may also include an optional Rogowski coil system, which can include one or more primary Rogowski coils 302, 304, one or more secondary Rogowski coils 306, 308, 310 (which can further include voltage sensing), and one or more high-speed analog-to-digital converters (ADCs) 510. The DTM 200 may further include an optional accelerometer 518 (such as a G-sensor), a global positioning system (GPS) antenna, and associated receiver and processing circuitry. The memory 512 stores instructions (e.g., software, firmware, machine code, object code, etc.) executable by the processor 516 to perform various computing and control operations in accordance with present disclosure.

In yet another embodiment of the present disclosure, the DTM 200 may optionally include a mixed signal processor 508 designed for high accuracy measurement of power and energy in power line systems using Rogowski coils, current transformers, or shunt current sensors. When included, the mixed signal processor 508 can provide instantaneous voltage and current waveforms and calculate root mean square (RMS) values of voltages and currents, as well as calculate active, reactive, and apparent power and energy. When Rogowski coils are included with the DTM 200, such coils may be secured around the transformer's primary and/or secondary terminals (as applicable and provided that the coils and their associated holders are properly constructed to withstand the voltages and currents at issue), but they may be alternatively secured directly around the primary or secondary power lines.

In further embodiments, the DTM 200 may include highly accurate non-piercing or piercing sensors, onboard communication modules to transmit information, and an AC-to-DC power supply. The DTM 200 may report information and data to a collection engine and/or an existing SCADA/MDM system where relevant transformer data and other data (such as the raw optical sensor information or information derived therefrom) is stored and presented to a user. Furthermore, analytics platforms may be employed to interpret the information being captured and reported by the DTM 200.

The hatch door 120 or the DTM 200 can further include one or more accelerometers 518 coupled to the processor 516 for detection of sudden movement of the distribution transformer system 500 or any portion thereof, such as when the distribution transformer 100 is hit by a car or a fallen tree, falls into a sinkhole or as part of a mudslide, or experiences a lightning strike or an earthquake. The accelerometer 518 as well as some of the other devices (such as the ADCs 510 and the secondary Rogowski coils with voltage sense) may be coupled to the processor 516, such as a microcontroller. The microcontroller 516 may send (or receive) the gathered data (from the microcontroller 516, the optical sensor 202, other sensors, GPS, etc.) to the communication interface module 522 (such as an Internet of Things (IoT) data modem), which may support communication via LTE, 5G, or another wireless protocol, and is also able to receive and transmit GPS or other location data to a remote server.

In some embodiments, the communication module 522 can include a global positioning system receiver and in other embodiments a separate GPS receiver can be coupled to at least one or more distribution transformer systems 300, 500 in a transmission system 400 to detect any sudden movement or acceleration (e.g., earthquake, crash impact, lightning strike, etc.). In some embodiments, the distribution transformer system 300, 500 may further monitor and transmit at least a corresponding waveform or data representative of the waveform for the distribution transformer 100 in such a system 300, 500 using the parameter sensors or Rogowski coil or coils (and a waveform capturing and processing device or display) as previously described. The system may generally be configured to generate an alert when at least the corresponding waveform (or certain data) is beyond a predetermined deviation from a reference waveform (or from reference data).

Figure 6:
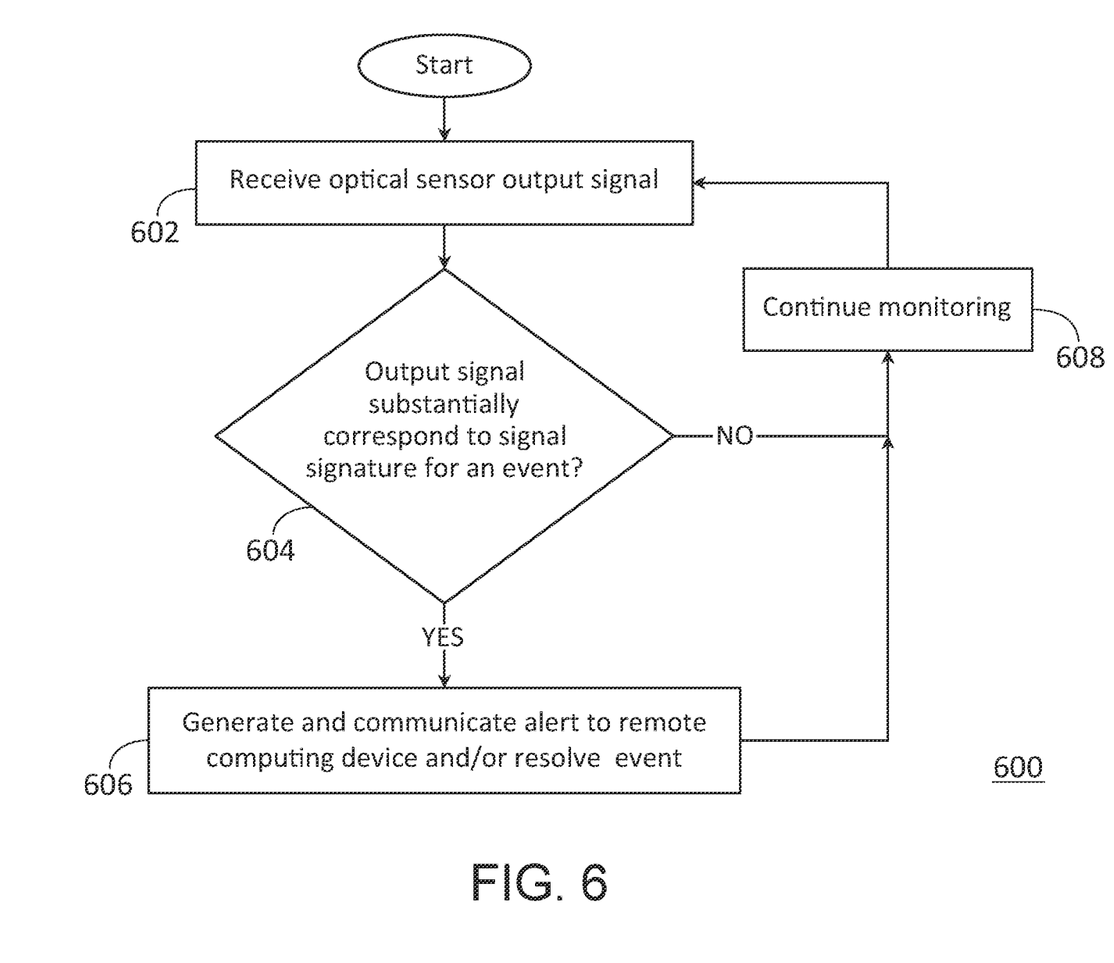
FIG. 6 illustrates a logic flow diagram of steps executable by a processor for detecting and reporting an optical event at a distribution transformer, in accordance with exemplary embodiments of the present disclosure.

FIG. 6 illustrates a logic flow diagram 600 of steps executable by a processor 516 for detecting and reporting an optical event at a distribution transformer 100, in accordance with exemplary embodiments of the present disclosure. According to the exemplary logic flow, the processor 516 receives (602) an output signal from an optical sensor 202 positioned at a location of the distribution transformer 100. The processor 516 then determines (604) whether the optical sensor's output signal substantially corresponds to a signal signature representing an event. For example, the processor 516 may determine whether the optical sensor's output signal substantially corresponds to one of a plurality of stored signal signatures representing corresponding events. Such signatures may correspond to optical events, such as arcing, fire, and exposure to ambient light (such as when the hatch door 120 is opened). When the optical sensor's output signal substantially corresponds to a signal signature representing an event, the processor 516 generates and communicates (606) an alert to a remote computing device, such as a remote server. The alert may include information informing as to which event signature has been detected. Alternatively, the processor 516 may resolve the detected event by, for example, switching off power to the distribution transformer 100 or initiating an audible alarm and activating a motor to close the hatch door 120. When the optical sensor's output signal does not substantially correspond to a signal signature representing an event, the processor 516 continues (608) to monitor for any optically related events by continuing to receive (602) the output signal of the optical sensor 202.

Figure 7:
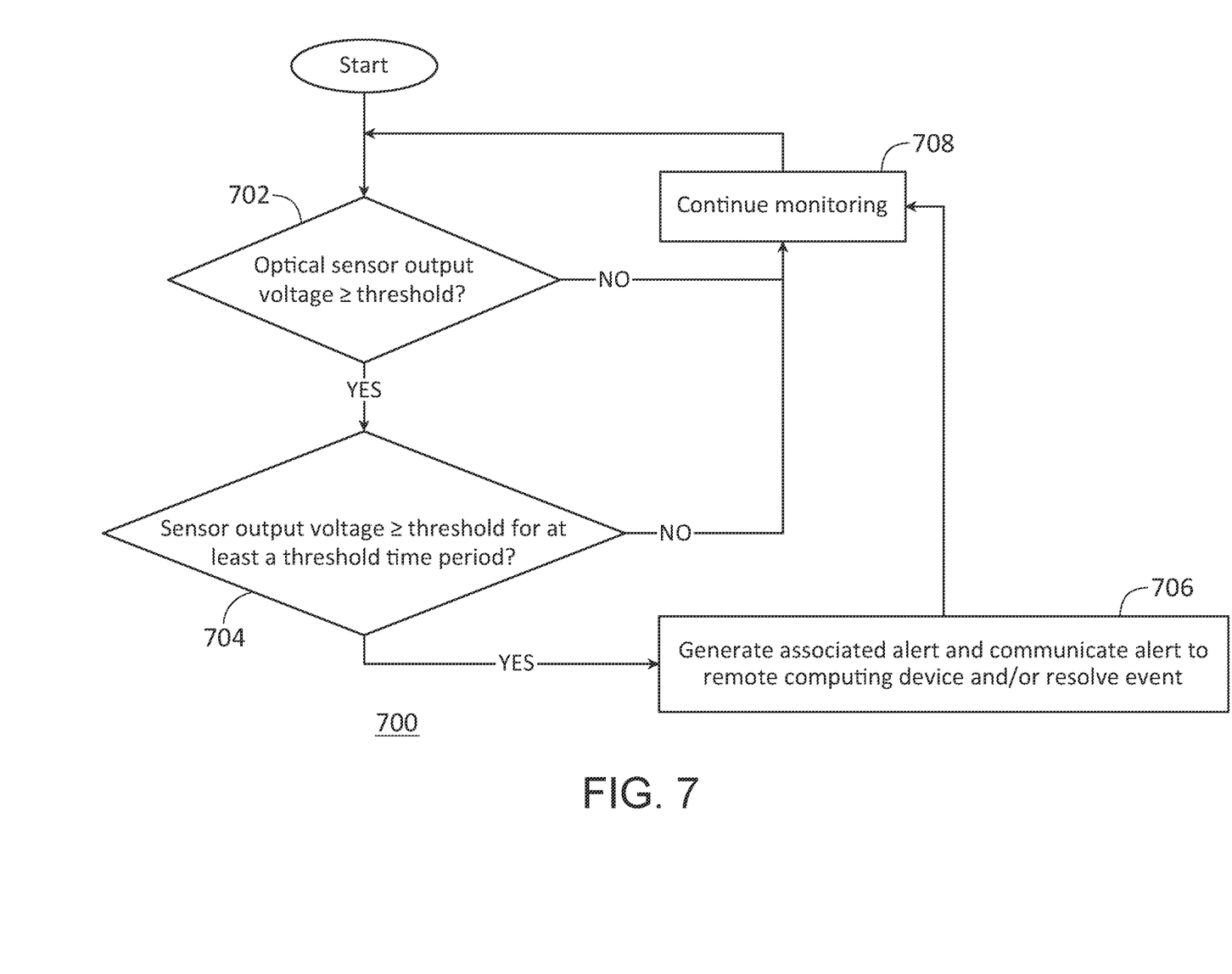
FIG. 7 illustrates a logic flow diagram of steps executable by a processor for detecting and reporting optical events at a distribution transformer based on output signals generated by an optical sensor positioned at the distribution transformer, in accordance with alternative embodiments of the present disclosure.

FIG. 7 illustrates a logic flow diagram 700 of steps executable by a processor 516 for detecting and reporting optical events at a distribution transformer 100 based on output signals generated by an optical sensor 202 positioned at the distribution transformer 100, in accordance with alternative embodiments of the present disclosure. According to the logic flow of FIG. 7, the processor 516 receives an output signal (e.g., a voltage) from the optical sensor 202 and determines (702) whether the received signal is greater than or equal to a signal threshold (e.g., a voltage threshold). When the received signal is greater or equal to the signal threshold, the processor 516 further determines (704) whether the optical sensor's output signal has remained greater than or equal to the signal threshold for at least a threshold time period and optionally a selected time period range, which is representative of an event signature. When the processor 516 determines that the optical sensor's output signal has remained greater than or equal to the signal threshold for at least the threshold time period, the processor further generates an associated alert and communicates (706) the alert to a remote computing device. The alert may include information informing as to which event signature has been detected. Alternatively, the processor 516 may resolve the detected event by, for example, switching off power to the distribution transformer 100 or initiating an audible alarm and activating a motor to close the hatch door 120. When the optical sensor's output signal is not greater than or equal to the signal threshold or hasn't remained greater than or equal to the signal threshold for at least the threshold time period, the processor 516 continues (708) to monitor the output signal of the optical sensor 202.

In some embodiments where the signal threshold is a voltage threshold, the voltage threshold may be a voltage that corresponds to 50 lumens of incident light (e.g., 200 mV depending on the selected optical sensor) and the threshold time period may be one second or less (e.g., a time period in the range of 3 ms to 1000 ms) for an event signature corresponding to arcing occurring or that has occurred between a secondary terminal and ground. Alternatively, the voltage threshold may be a voltage that corresponds to 100 lux of incident light (e.g., 200 mV to 2500 mV depending on the selected optical sensor) and the threshold time period may be several seconds (e.g., ten seconds) for an event signature corresponding to a fire occurring or that has occurred inside the hatch of a pad-mounted distribution transformer 100. Further the voltage threshold may a voltage that corresponds to 100 lux of incident light and the threshold time period may be several seconds (e.g., ten to thirty seconds) for an event signature corresponding to the hatch door 120 of a pad-mounted distribution transformer 100 being open or having been opened.

In some embodiments, as illustrated by FIG. 3A, the distribution transformer 100 is a pad-mounted distribution transformer, where at least the optical sensor 202 and the secondary terminals 106, 108, 110 are positioned within a hatch defined by a housing 125 of the pad-mounted distribution transformer 100, and where the alert informs the remote computing device that a fire is occurring or has occurred in the hatch.

In other embodiments, the distribution transformer may be a pad-mounted distribution transformer 100 and at least the optical sensor 202 and the secondary terminals 106, 108, 110 are positioned within a hatch of the pad-mounted distribution transformer 100.

In some embodiments, the optical sensor 202, the processor, and the communication interface form part of a distribution transformer monitoring device 200 and the distribution transformer monitoring device 200 is positioned within the hatch of the pad-mounted distribution transformer 100.

In some embodiments, a distribution transformer monitoring device 200 includes an optical sensor 202 operable to generate an output voltage in response to incident light, a communication interface, a non-transitory memory storing processor-executable instructions, and a processor operably coupled to the optical sensor 202, the communication interface, and the memory. The processor may be operable in accordance with the processor-executable instructions to determine whether an output signal from the optical sensor 202 substantially corresponds to one of a plurality of signatures representing corresponding events and communicate via the communication interface an alert to a remote computing device when the output signal substantially corresponds to one of the plurality of event signatures.

In some embodiments, the processor may determine whether the output signal substantially corresponds to or matches one of the plurality of event signatures by determining whether the optical sensor output voltage is greater than or equal to a voltage threshold, and determining whether the optical sensor output voltage remained greater than or equal to the voltage threshold for at least a threshold time period when the optical sensor output voltage is determined to be greater than or equal to the voltage threshold. In such instances, the processor may communicate, via the communication interface, an alert to a remote computing device when the optical sensor output voltage is determined to have remained greater than or equal to the voltage threshold for at least the threshold time period.

In other embodiments, multiple event signatures may be stored in memory accessible by the processor. Each such signature may include a respective voltage threshold and a threshold duration of time necessary for the voltage threshold to be met or exceeded. In some embodiments, the alert informs the remote computing device that arcing is occurring or has occurred between at least one of secondary terminals and ground or between a primary terminal and ground. Upon determining the occurrence of an event based on the event signature, the processor may send an alert to a remote computing device informing of the detected event.

In some embodiments, as shown in FIG. 3A and FIG. 5, the optical sensor 202, the processor 516, and the communication interface module 522 may form part of the DTM 200 and, where the DTM 200 is positioned within a hatch 120 defined by a housing 125 of a pad-mounted distribution transformer 100, the hatch door 120 may optionally include a translucent window 150 aligned with the optical sensor 202 of the DTM 200 to allow light external to the hatch door 120 to be detectable by the optical sensor 202 when the hatch door 120 is closed. In an alternative embodiment, the optical sensor 202, the processor 516, and the communication interface module 522 may be incorporated directly into the distribution transformer 100, without the need for a separate DTM 200.

In some embodiments, a distribution transformer system includes a sealed tank 126 containing a power transformer 502 and insulative coolant, an openable and closable hatch door 120, a wall 103 separating the power transformer 502 and its coolant from the hatch and to which is secured user-accessible primary terminals 102, 104 and secondary terminals 106, 108, 110 of the power transformer 502, and a distribution transformer monitoring device 200 positioned within the hatch and optionally secured to the wall 103. The distribution transformer monitoring device 200 may include an optical sensor 202 operable to generate an output signal (e.g., voltage) in response to incident light, a communication interface 522, non-transitory memory 512 storing processor-executable instructions, and a processor 516, operably coupled to the optical sensor 202, the communication interface 522, and the memory 512. The processor 516 may be operable in accordance with the processor-executable instructions to determine whether the optical sensor output signal is greater than or equal to a signal threshold (e.g., voltage threshold) and, if so, determine whether the optical sensor output signal remained greater than or equal to the signal threshold for at least a threshold time period. When both criteria are met, the processor 516 may communicate, via the communication interface 522, an alert to a remote computing device, such as a cloud server.

In the absence of any specific statement herein to the contrary, where the terms "substantially," "generally," "approximately," or "about" are used as modifiers in the present disclosure and any appended claims (e.g., to modify a structure, a dimension, a measurement, or some other characteristic), it is understood that the characteristic, feature, or function may vary by up to thirty percent or that the characteristic, feature, or function may be only partially includes. For example, an output signal substantially corresponds to an event signature when the material features of the output signal are within thirty percent of the material features defining the event signature. Where the material features of an event signature are, for example, voltage level and time duration, the output signal substantially corresponds to the event signature when the voltage level is within thirty percent of the voltage level of the event signature and the time duration is within thirty percent of the time duration of the event signature.

The terms "include" and "comprise" as well as derivatives thereof, in all their syntactic contexts, are to be construed without limitation in an open, inclusive sense, (e.g., "including, but not limited to"). The term "or," is inclusive, meaning "and/or." The phrases "associated with" and "associated therewith," as well as derivatives thereof, can be understood as meaning to include, be included within, interconnect with, contain, be contained within, connect to or with, couple to or with, be communicable with, cooperate with, interleave, juxtapose, be proximate to, be bound to or with, have, have a property of, or the like.

Unless the context requires otherwise, throughout the specification and claims which follow, the word "comprise" and variations thereof, such as "comprises" and "comprising," are to be construed in an open, inclusive sense (e.g., "including, but not limited to").

Reference throughout this specification to "one embodiment" or "an embodiment" or "some embodiments" and variations thereof mean that a particular feature, structure, or characteristic described in connection with the embodiment is included in at least one embodiment. Thus, the appearances of the phrases "in one embodiment" or "in an embodiment" or "in an exemplary embodiment" or "in some embodiments" and so forth in various places throughout this specification are not necessarily or likely all referring to the same embodiment. Furthermore, the particular features, structures, or characteristics disclosed herein may be combined in any suitable manner in one or more embodiments.

As used in this specification and the appended claims, the singular forms "a," "an," and "the" include plural referents unless the content and context clearly dictate otherwise. It should also be noted that the conjunctive terms, "and" and "or" are generally employed in the broadest sense to include "and/or" unless the content and context clearly dictate inclusivity or exclusivity, as the case may be. In addition, the composition of "and" and "or" when recited herein as "and/or" is intended to encompass an embodiment that includes all the associated items or elements and one or more other alternative embodiments that include fewer than all of the associated items or elements.

Except as the context may dictate otherwise, the singular shall mean the plural and vice versa within this disclosure. Also, the masculine shall mean the feminine and vice versa.

The various embodiments described above can be combined to provide further embodiments. Additionally, aspects of the disclosed embodiments can be modified, if necessary, to employ concepts and embodiments disclosed in various patents, published applications, and other publications to provide further embodiments.

What is claimed is:

1. A method for detecting occurrence of an event at a distribution transformer, the method comprising:
    generating, by an optical sensor positioned at a location of the distribution transformer, an output signal;
    determining, by a processor operably coupled to the optical sensor, whether the output signal substantially corresponds to a signal signature representing an event; and
    when the output signal substantially corresponds to the signal signature, communicating, by the processor via a communication interface, an alert to a remote computing device, wherein the alert informs the remote computing device that arcing is occurring or has occurred at the distribution transformer.

2. The method of claim 1, wherein the optical sensor is positioned within two meters of one or more secondary terminals of the distribution transformer.

3. A method for detecting occurrence of an event at a distribution transformer, the method comprising:
    generating, by an optical sensor positioned at a location of the distribution transformer, an output voltage;
    determining, by a processor operably coupled to the optical sensor, whether the output voltage is greater than or equal to a signal threshold, wherein the signal threshold is a voltage that corresponds to 100 lux of incident light;
    when the output voltage is greater than or equal to the signal threshold, determining, by the processor, whether the output voltage remained greater than or equal to the signal threshold for at least ten seconds;
    when the output voltage remained greater than or equal to the signal threshold for at least ten seconds, determining, by the processor, that the output voltage substantially corresponds to a signal signature representing an event; and
    when the output voltage substantially corresponds to the signal signature, communicating, by the processor via a communication interface, an alert to a remote computing device.

4. A method for detecting occurrence of an event at a distribution transformer, wherein the distribution transformer is a pad-mounted distribution transformer, the method comprising:
    generating, by an optical sensor positioned at a location of the distribution transformer, an output signal, wherein at least the optical sensor is positioned within a hatch defined by a housing of the pad-mounted distribution transformer;
    determining, by a processor operably coupled to the optical sensor, whether the output signal substantially corresponds to a signal signature representing an event; and
    when the output signal substantially corresponds to the signal signature, communicating, by the processor via a communication interface, an alert to a remote computing device, wherein the alert informs the remote computing device that a fire is occurring or has occurred in the hatch.

5. A method for detecting occurrence of an event at a distribution transformer, wherein the distribution transformer is a pad-mounted distribution transformer, the method comprising:
generating, by an optical sensor positioned at a location of the distribution transformer, an output signal, wherein at least the optical sensor is positioned within a hatch defined by a housing of the pad-mounted distribution transformer;
determining, by a processor operably coupled to the optical sensor, whether the output signal substantially corresponds to a signal signature representing an event; and
when the output signal substantially corresponds to the signal signature, communicating, by the processor via a communication interface, an alert to a remote computing device, wherein the alert informs the remote computing device that a hatch door of the pad-mounted distribution transformer is open or has been opened.

6. The method of claim 3, wherein:
the distribution transformer is a pad-mounted distribution transformer;
the optical sensor, the processor, and the communication interface form part of a distribution transformer monitoring device; and
the distribution transformer monitoring device is positioned within a hatch of the pad-mounted distribution transformer.

7. A distribution transformer monitoring device attachable to a housing of a distribution transformer, the distribution transformer monitoring device comprising:
an optical sensor operable to generate an output signal in response to incident light;
a communication interface;
a non-transitory memory storing processor-executable instructions; and
a processor, operably coupled to the optical sensor, the communication interface, and the memory, operable in accordance with the processor-executable instructions to:
determine whether the output signal substantially corresponds to a signal signature representing an event; and
when the output signal substantially corresponds to the signal signature, communicate, via the communication interface, an alert to a remote computing device, wherein the alert informs the remote computing device that arcing is occurring or has occurred at the distribution transformer.

8. The distribution transformer monitoring device of claim 7, wherein the processor determines whether the output signal substantially corresponds to a signal signature representing an event by:
determining whether the output signal is greater than or equal to a signal threshold;
when the output signal is greater than or equal to the signal threshold, determining whether the output signal remained greater than or equal to the signal threshold for at least a threshold time period; and
when the output signal remained greater than or equal to the signal threshold for at least the threshold time period, determining that the output signal substantially corresponds to the signal signature.

9. A distribution transformer monitoring device attachable to a housing of a distribution transformer, the distribution transformer monitoring device comprising:
an optical sensor operable to generate an output signal in response to incident light;
a communication interface;
a non-transitory memory storing processor-executable instructions; and
a processor, operably coupled to the optical sensor, the communication interface, and the memory, operable in accordance with the processor-executable instructions to:
determine whether the output signal substantially corresponds to a signal signature representing an event; and
when the output signal substantially corresponds to the signal signature, communicate, via the communication interface, an alert to a remote computing device, wherein the alert informs the remote computing device that a fire is occurring or has occurred at the distribution transformer.

10. A distribution transformer monitoring device attachable to a housing of a distribution transformer, wherein the distribution transformer is a pad-mounted distribution transformer, the distribution transformer monitoring device comprising:
an optical sensor operable to generate an output signal in response to incident light;
a communication interface;
a non-transitory memory storing processor-executable instructions; and
a processor, operably coupled to the optical sensor, the communication interface, and the memory, operable in accordance with the processor-executable instructions to:
determine whether the output signal substantially corresponds to a signal signature representing an event; and
when the output signal substantially corresponds to the signal signature, communicate, via the communication interface, an alert to a remote computing device, wherein the alert informs the remote computing device that a hatch door of the pad-mounted distribution transformer is open or has been opened.

11. The distribution transformer monitoring device of claim 7, further comprising:
a plurality of parameter sensors operably coupled to the processor to enable the processor to monitor a plurality of parameters of the distribution transformer.

12. A distribution transformer system comprising:
a distribution transformer including:
a sealed tank containing a power transformer and insulative coolant; and
one or more secondary terminals of the power transformer accessible from outside the tank; and
a distribution transformer monitoring device secured to the distribution transformer, the distribution transformer monitoring device including:
an optical sensor operable to generate an output signal in response to incident light;
a communication interface;
a non-transitory memory storing processor-executable instructions; and
a processor, operably coupled to the optical sensor, the communication interface, and the memory, the processor being operable in accordance with the processor-executable instructions to:
determine whether the output signal generated by the optical sensor substantially corresponds to a signal signature representing an event; and communicate an alert to a remote computing device, via the communication interface, when the output signal generated by the optical sensor substantially corresponds to the signal signature, wherein the alert informs the remote computing device that (a) arcing is occurring or has occurred at the distribution transformer or (b) a fire is occurring or has occurred at the distribution transformer.

13. The distribution transformer system of claim 12, wherein the distribution transformer monitoring device is positioned within two meters of the one or more secondary terminals of the distribution transformer.

14. The distribution transformer system of claim 12, wherein the distribution transformer monitoring device further includes a plurality of parameter sensors operably coupled to the processor to enable the processor to monitor a plurality of parameters of the distribution transformer.

15. The distribution transformer system of claim 12, wherein the processor determines whether the output signal substantially corresponds to a signal signature representing an event by:
   determining whether the output signal is greater than or equal to a signal threshold;
   when the output signal is greater than or equal to the signal threshold, determining whether the output signal remained greater than or equal to the signal threshold for at least a threshold time period; and
   when the output signal remained greater than or equal to the signal threshold for at least the threshold time period, determining that the output signal substantially corresponds to the signal signature.

16. A distribution transformer system comprising:
   a pad-mounted distribution transformer including:
      a sealed tank containing a power transformer and insulative coolant;
      an openable and closable hatch door; and
      one or more secondary terminals of the power transformer positioned within a hatch defined by a wall of the tank and the hatch door when the hatch door is closed, the hatch being separated from an internal chamber of the tank by at least the wall of the tank; and
   a distribution transformer monitoring device positioned within the hatch of the distribution transformer, the distribution transformer monitoring device including:
      an optical sensor operable to generate an output signal in response to incident light;
      a communication interface;
      a non-transitory memory storing processor-executable instructions; and
      a processor, operably coupled to the optical sensor, the communication interface, and the memory, the processor being operable in accordance with the processor-executable instructions to:
         determine whether the output signal generated by the optical sensor substantially corresponds to a signal signature representing an event; and
         communicate an alert to a remote computing device, via the communication interface, when the output signal generated by the optical sensor substantially corresponds to the signal signature, wherein the alert informs the remote computing device that (a) arcing is occurring or has occurred at the distribution transformer, (b) a fire is occurring or has occurred at the distribution transformer, or (c) a hatch door of the distribution transformer is open or has been opened.

17. The distribution transformer system of claim 16, wherein the processor determines whether the output signal substantially corresponds to a signal signature representing an event by:
   determining whether the output signal is greater than or equal to a signal threshold;
   when the output signal is greater than or equal to the signal threshold, determining whether the output signal remained greater than or equal to the signal threshold for at least a threshold time period; and
   when the output signal remained greater than or equal to the signal threshold for at least the threshold time period, determining that the output signal substantially corresponds to the signal signature.

* * * * *